(12) United States Patent
Kung et al.

(10) Patent No.: US 8,576,724 B2
(45) Date of Patent: Nov. 5, 2013

(54) METHOD, SYSTEM, AND COMPUTER PROGRAM PRODUCT, FOR CORRELATING SPECIAL SERVICE IMPACTING EVENTS

(75) Inventors: Yu-Lein Kung, Holmdel, NJ (US); Jeffrey Stein, Cliffwood, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 484 days.

(21) Appl. No.: 12/625,146

(22) Filed: Nov. 24, 2009

(65) Prior Publication Data

US 2011/0122773 A1 May 26, 2011

(51) Int. Cl.
*H04L 12/26* (2006.01)
(52) U.S. Cl.
USPC ........................................................ 370/241
(58) Field of Classification Search
USPC ......... 370/241–245, 248, 250, 259, 351, 352; 379/1.01–9, 26.01–27.08
See application file for complete search history.

(56) References Cited

U.S. PATENT DOCUMENTS

| | | | | |
|---|---|---|---|---|
| 5,195,126 | A * | 3/1993 | Carrier et al. | 379/45 |
| 5,659,605 | A * | 8/1997 | Voit et al. | 379/243 |
| 5,761,502 | A * | 6/1998 | Jacobs | 1/1 |
| 6,445,774 | B1 * | 9/2002 | Kidder et al. | 379/9.03 |
| 6,856,676 | B1 * | 2/2005 | Pirot et al. | 379/201.01 |
| 7,245,609 | B2 * | 7/2007 | D'Eletto | 370/352 |
| 7,813,335 | B2 | 10/2010 | Terpstra et al. | |
| 7,941,136 | B2 * | 5/2011 | Reed et al. | 455/424 |
| 7,961,720 | B2 | 6/2011 | Terpstra et al. | |
| 2006/0072555 | A1 | 4/2006 | St. Hilaire et al. | |
| 2006/0258339 | A1 * | 11/2006 | Connelly et al. | 455/414.1 |
| 2006/0274703 | A1 * | 12/2006 | Connelly | 370/338 |
| 2008/0181122 | A1 * | 7/2008 | Ruppelt | 370/245 |

OTHER PUBLICATIONS

Cisco, MeetingPlace Server IP Trunk Group Between an Avaya Communications Server and a MeetingPlace Configuration Example, Jan. 31, 2006, Document ID: 51632, as downloaded on Jun. 6, 2012 from the url at http://www.cisco.com/en/US/products/sw/ps5664/ps5669/products_configuration_example09186a008022b3d3.shtml, pp. 1-8.
Network Equipment Technologies, VX Key Concepts, Sep. 9, 2010, as downloaded on Jun. 6, 2012 from the url at https://support.net.com/display/VXDOC/VX+Key+Concepts#VXKeyConcepts-trunk-group, pp. 1-5.

* cited by examiner

*Primary Examiner* — Dmitry H Levitan
(74) *Attorney, Agent, or Firm* — Parks IP Law LLC; Jennifer P. Medlin, Esq.

(57) ABSTRACT

Special service impacting events in an IP network are collected and correlated. Real-time data representing occurrence of trunk group events impacting special services in trunk groups that are in service is collected, along with call detail records recorded by network elements representing occurrence of call events impacting special services and performance measurements of network elements representing occurrence of events affecting performance of the network elements impacting the special services. The collected real-time data representing occurrence of trunk group events, collected call detail record and collected performance measurements are correlated, and alarms are generated based on the correlated data.

17 Claims, 3 Drawing Sheets

METHOD, SYSTEM, AND COMPUTER PROGRAM PRODUCT, FOR CORRELATING SPECIAL SERVICE IMPACTING EVENTS

BACKGROUND

Exemplary embodiments relate to capturing of events in a network, and, in particular, capturing and correlation of special-service-impacting events.

Internet Protocol (IP) technology has been in the market for several years. However, service assurance in an IP network, e.g., a Voice over Internet Protocol (VoIP) network, for performance, reliability, and maintenance automation is relatively new in the network management arena.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to an exemplary embodiment, a computer-implemented method correlates special-service-impacting events occurring in an internet protocol (IP) network. Real-time data representing occurrence of trunk group events impacting special services in trunk groups that are in service is collected, along with call detail records recorded by network elements representing occurrence of call events impacting special services and performance measurements of network elements representing occurrence of events affecting performance of the network elements impacting the special services. The collected real-time data representing occurrence of trunk group events is correlated with the collected call detail records and collected performance measurements, and alarms are generated based on the correlated data According to another embodiment, a system correlates events impacting special services occurring in an internet protocol (IP) network. The system includes an input for receiving collected real-time data representing occurrence of trunk group events impacting special services in trunk groups that are in service, collected call detail records recorded by network elements representing occurrence of call events impacting special services, and collected performance measurements of network elements representing occurrence of events affecting performance of the network elements impacting the special services. The system further includes a correlator for correlating the collected real-time data representing occurrence of trunk group events, collected call detail records and collected performance measurements. Alarms are generated based on the correlated data.

According to another embodiment, a computer program product includes a computer readable storage medium having encoded instructions stored thereon for correlating events impacting special services occurring in an internet protocol (IP) network. The instructions, when executed by a computer, cause the computer to collect real-time data representing occurrence of trunk group events impacting special services in trunk groups that are in service, collect call detail records recorded by network elements representing occurrence of call events impacting special services and collect performance measurements of network elements representing occurrence of events affecting performance of the network elements impacting the special services. The collected real-time data representing occurrence of trunk group events is correlated with the collected call detail records and collected performance measurements, and alarms are generated based on the correlated data.

According to another embodiment, other methods, computer program products, and/or systems according to various embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
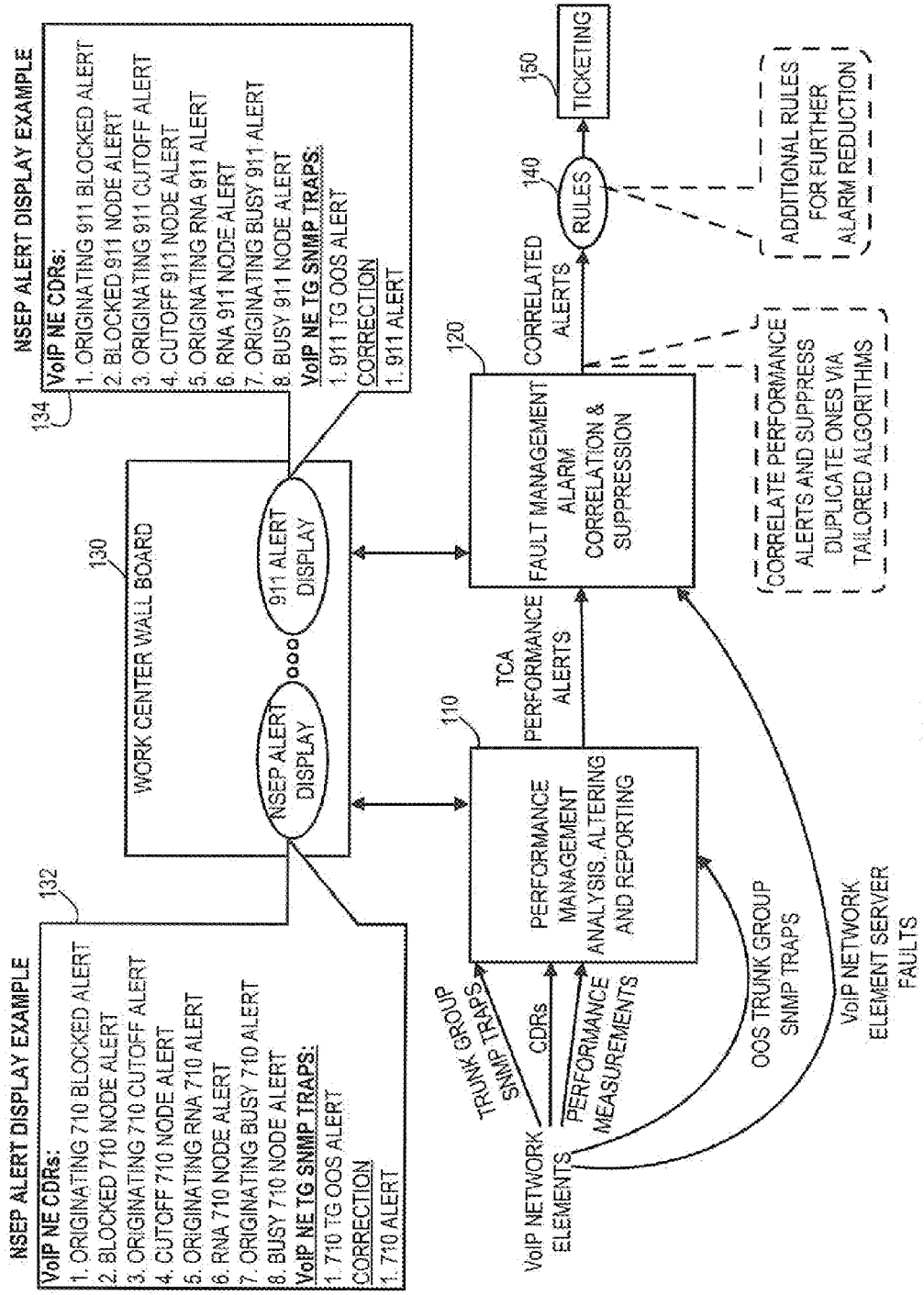
FIG. 1 illustrates an exemplary system for collecting, correlating, and generating alarms based on data representing the occurrence of special service impacting events according to exemplary embodiments.

Exemplary embodiments will be described more fully hereinafter with reference to the accompanying figures, in which embodiments are shown. This invention may, however, be embodied in many alternate forms and should not be construed as limited to the embodiments set forth herein.

Exemplary embodiments are described below with reference to block diagrams and/or flowchart illustrations of methods, apparatus (systems and/or devices) and/or computer program products. It should be understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.) that runs on a processor such as a digital signal processor, collectively referred to as "circuitry" or "a circuit". Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate or transport the program for use by or in connection with the instruction execution system, apparatus, or device.

The computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Monitoring of trunk group out of service (OOS) events is often separately monitored by trunk group simple network management protocol (SNMP) traps received directly from network elements. As those skilled in the art will appreciate, Simple Network Management Protocol (SNMP) is used in network management systems to monitor network-attached devices for conditions that warrant administrative attention. SNMP is a component of the Internet Protocol Suite as defined by the Internet Engineering Task Force (IETF). Details of the Internet Protocol Suite as defined by the IETF are well-known by those of ordinary skill in the art. The current lack of correlating these SNMP trap events to special services riding over dedicated trunk groups results in several problems, including special service trouble isolation and detection delay, network assurance work center network manager resource waste, and potential critical special services outages not being recognized in time.

According to exemplary embodiments, these SNMP trap events are correlated for special services riding over dedicated trunk groups. Network management information may be displayed that enhances the ability of network managers to quickly trouble-shoot problems impacting sensitive special services, such as "911" and "NSEP" (National Security and Emergency Preparedness), which require immediate attention due to their time-critical importance. According to exemplary embodiments, network managers are able to monitor special-service-impacting out of service trunk group events in a visual manner and are able to acquire the ability to see a correlation with other types of special service alerts (such as CDR-derived special service alerts) in a display and a trouble ticket According to exemplary embodiments, the correlation of data representing special-service-impacting events occurring for in-service trunk groups and out-of-service trunk groups allows several benefits to be realized, including near-real-time visual display of special service-impacting events including trunk group OOS events and network element server faults, the ability to group special-service-impacting events together in a single display area, or on a single trouble ticket or work list, and a correlation of special-service-impacting events to reduce the total number of alerts, while clearly indicating the special-service-impacting event(s) and the extent of the event(s).

FIG. 1 illustrates an exemplary system for collecting, correlating, and presenting correlated data representing the occurrence of special-service-impacting events in a network according to exemplary embodiments. Referring to FIG. 1, the system includes a collector 110 for performance management analysis, alerting and reporting The collector 110, which may be implemented as a server, collects substantially real-time data representing events that impact special services, such as in-service/out-of-service trunk group SNMP traps, call detail records (CDRs), and performance of network elements, such as Network Gateway Border Elements (NGBE) for IP-to-PSTN or PSTN-to-IP calls or IP Border Element (IPBE)s for IP-to-IP calls. Trunk group events may include, for example, occurrences of simple network management protocol (SNMP) trap events, the call events may include at least one of call set-up, call prorates, and call-tear down, and the performance measurements may include data from managing information bases (MIBs), total available or unblocked PSTN channels for the trunk group, total configured PSTN channels for the trunk group, trunk group out-of-service SNMP traps due to facility OOS (Out-Of-Service), and trunk group out-of-service SNMP traps due to administrative OOS. This data may be collected from various network elements in a communication network supporting at least one of video teleconferencing services, voice communication, and data communication, such as a VoIP network. Although one collector 110 is shown in FIG. 1 for ease of illustration, it should be appreciated that there may be multiple collectors 110 to balance the load of collecting data.

The collector 110 analyses the collected data and generates alerts for display on, e.g., a display unit 130 (also referred to as a work center wall board). The data for display may be delivered to the wall center board 130 via any suitable link, e.g., a data bus, a wireless link, or a broadband link. FIG. 1 shows examples of an NSEP alert display 132 and a 911 alert display 134 which may be displayed on the work center wall board 130. The example NSEP alert display 132 and 911 alert display 134 may include various including CDR codes, SNMP trap codes, and Correction codes. For example, the NSEP alert display 132 may display various VoIP NE CDRs, VoIP NE TG SNMP TRAPS, and Correction, as follows: VoIP NE CDRs: 1. ORIGINATING 710 BLOCKED ALERT, 2. BLOCKED 710 NODE ALERT, 3. ORIGINATING 710 CUTOFF ALERT, 4. CUTOFF 710 NODE ALERT, 5. ORIGINATING RNA 710 ALERT, 6. RNA 710 NODE ALERT, 7. ORIGINATING BUSY 710 ALERT, and 8. BUSY 710 NODE ALERT; VoIP NE TG SNMP STRAPS: 1. 710 TG OOS ALERT; and CORRECTION: 1. 710 ALERT. The 911 alert display 134, may also include various codes including CDR codes, SNMP trap codes, and Correction codes. For example, the NSEP alert display 132 may display various VoIP NE CDRs, VoIP NE TG SNMP TRAPS, and Correction, as follows: VoIP NE CDRs: 1. ORIGINATING 911 BLOCKED ALERT, 2. BLOCKED 911 NODE ALERT, 3. ORIGINATING 911 CUTOFF ALERT, 4. CUTOFF 911 ODE ALERT, 5. ORIGINATING RNA 911 ALERT, 6. RNA 911 NODE ALERT, 7. ORIGINATING BUSY 911 ALERT, and 8. BUSY 911 NODE ALERT; VoIPNE TG SNMP TRAPS: 1. 911 TG OOS ALERT; and CORRECTION: 1. 911 ALERT. This data may be viewed by a network manager in a network center, and the network manager may acknowledge that the data has been reviewed and displayed.

According to an exemplary embodiment, in collecting the CDRs, the time interval related to a particular fault or event is examined. CDRs may be generated every time a call is made over a given time interval, e.g., five minutes. As an alternative, a sliding window or sliding timing interval may be used, e.g., five minutes, ten minutes, etc., to collect CDRs. The CDRs may be from different servers for different network elements for a given call within a given time interval. It may be difficult to relate a CDR event to any particular node/server or to any particular call, as there may be multiple fault events for one call. To address this, a call may be assigned a particular correlation identifier, such that even if there are multiple CDRs generated for a particular call, they will have the same correlation identifier. This enables the CDRs to be related to a particular call and aids in the analysis of fault events related to a call.

Data collected by the collector 110 is analyzed and correlated to produce alerts in the form of, e.g., Threshold Crossing Alert (TCA) performance alerts that are delivered to a correlator 120. The correlator 120, which may be implemented with a server, also collects network element server faults, e.g., VoIP network element server faults associated with a special service and correlates the alerts from the collector 110 with data extracted from VoIP network element server faults, generates alarms, and suppresses duplicate alarms that may be generated when the collected data includes data collected from multiple sources for the same event that is redundant in determining a root cause of an event.

A number of correlation techniques may be used to correlate the TCA performance alerts with the collected VoIP network element server faults. According to an exemplary embodiment, the output of the collector 110 is in SNMP format, which is the same as the format of the data collected by the correlator 120 from the VoIP network element. The correlation may be performed via trunk group names provided by SNMP traps. Thus, for example, a common element may be used to relate two alert types, such as such as trunk groups impacted, that appears in both alerts. This correlation enables the root cause of a problem causing special-service-impacting event to be determined with a minimum amount of alerts being generated. The correlator 120 outputs the correlated data to a work center wall board, such as display unit 130 so that it may be viewed by a network manager. The manager may, in turn, review the data and acknowledge receipt and review of the data. As can be seen from the examples of display screens 132 and 134, the correlated data may be presented as one or more alerts. In this manner, all the alert data for a particular special service may be presented for display in a single display area.

The correlated data may also be delivered to a rules server 140 for applying additional rules to reduce alarms generated. Based on these alarms, a trouble ticket may be generated by a ticketing server 150, such that all the events impacting a particular special service may be presented on the same trouble ticket. Although not illustrated, ticket data generated by the ticket server 150 may also be displayed on the work center wall board 130.

The work center wall board 130 may include, e.g., a processor that may filter data such that only particular events are illustrated. For example, only data related to cut-off calls may be illustrated if desired.

Although shown as separate servers, it should be appreciated that the servers 110, 120, 140, and 150 may be implemented integrated in one or more devices.

According to exemplary embodiments, the collection of in-service trunk group events, CDR events, performance measurements and OOS trunk group events allows for better correlation and improved event detection and alert generation. Correlation of the collected data reduces the total number of generated alerts and enables a clear indication of a special-service-impacting event(s) and the extent of the impact of the event(s).

Figure 2:
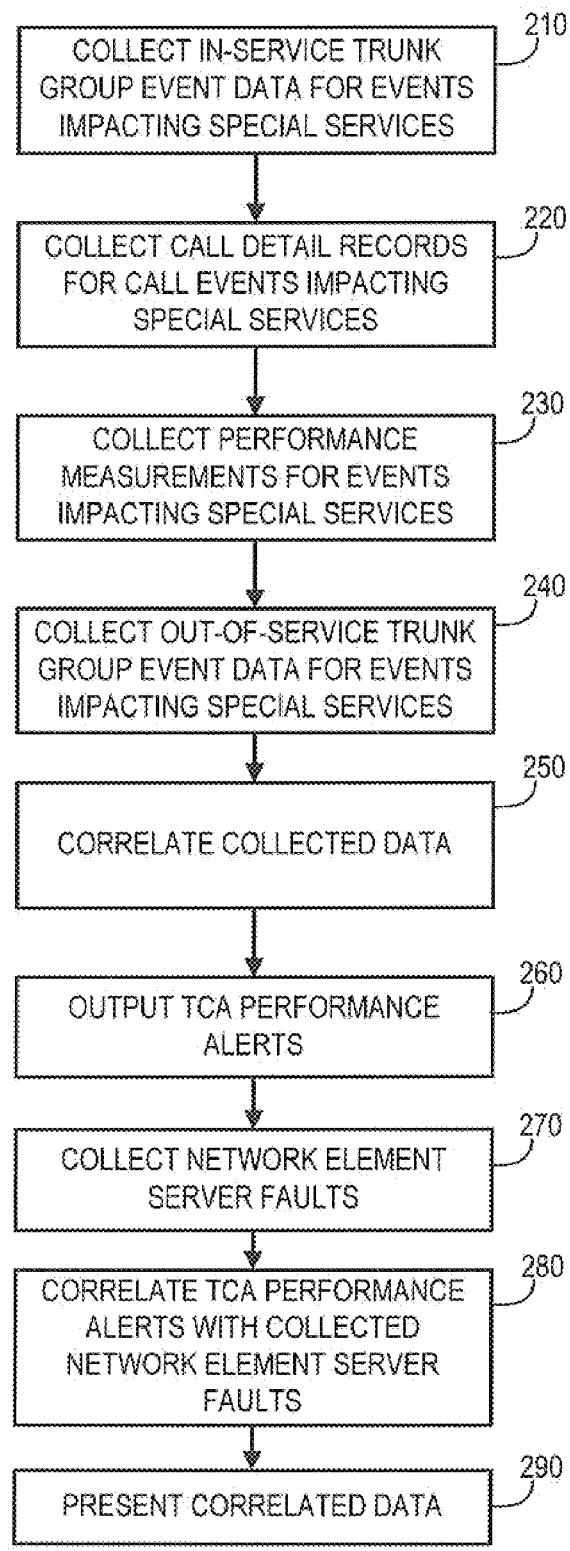
FIG. 2 is a flowchart illustrating a method for collecting, correlating, and presenting correlated data representing the occurrence of special service impacting events according to an exemplary embodiment.

FIG. 2 is a flowchart illustrating a method for collecting, correlating, and presenting correlated data representing the occurrence of special-service-impacting events according to exemplary embodiments. At step 210, in-service trunk group event data is collected by, e.g., the collector 110, for events impacting special services. At step 220, call detail records (CDRs) are collected by, e.g., the collector 110, for call events impacting special services. At step 230, performance measurements of various network elements affecting special services are collected by, e.g., the collector 110. At step 240, out-of-service trunk group event data is collected for out-of-service trunk group events impacting special services. This data may be collected, e.g., by collector 110. At step 250, the collected data (output in the form of TCA performance alerts) is correlated by, e.g., the collector 110. At step 260, the correlated data is output as correlated TCA performance alerts which may also be presented for display (e.g. work center wall board 130). At step 270, network element server faults, e.g., VoIP network element server faults, are collected by, e.g., correlator 120. At step 280, the VoIP network element server faults are correlated with the TCA performance alerts by, e.g., correlator 120. At step 290, the correlated alerts are output for display (e.g. work center wall board 130), further alarm reduction (e.g., via rules server 140), and ticket generation (e.g., via ticketing server 150). Although not shown in FIG. 2 for simplicity of illustration, fewer or additional steps may be included. Also, it should be appreciated that the order of steps is not restricted to that shown in FIG. 2. For example, the collected in-service trunk group event data may be presented, along with the call detail records, network performance measurements, and OOS event data for display before and/or after correlation with the VoIP network element server faults.

Figure 3:
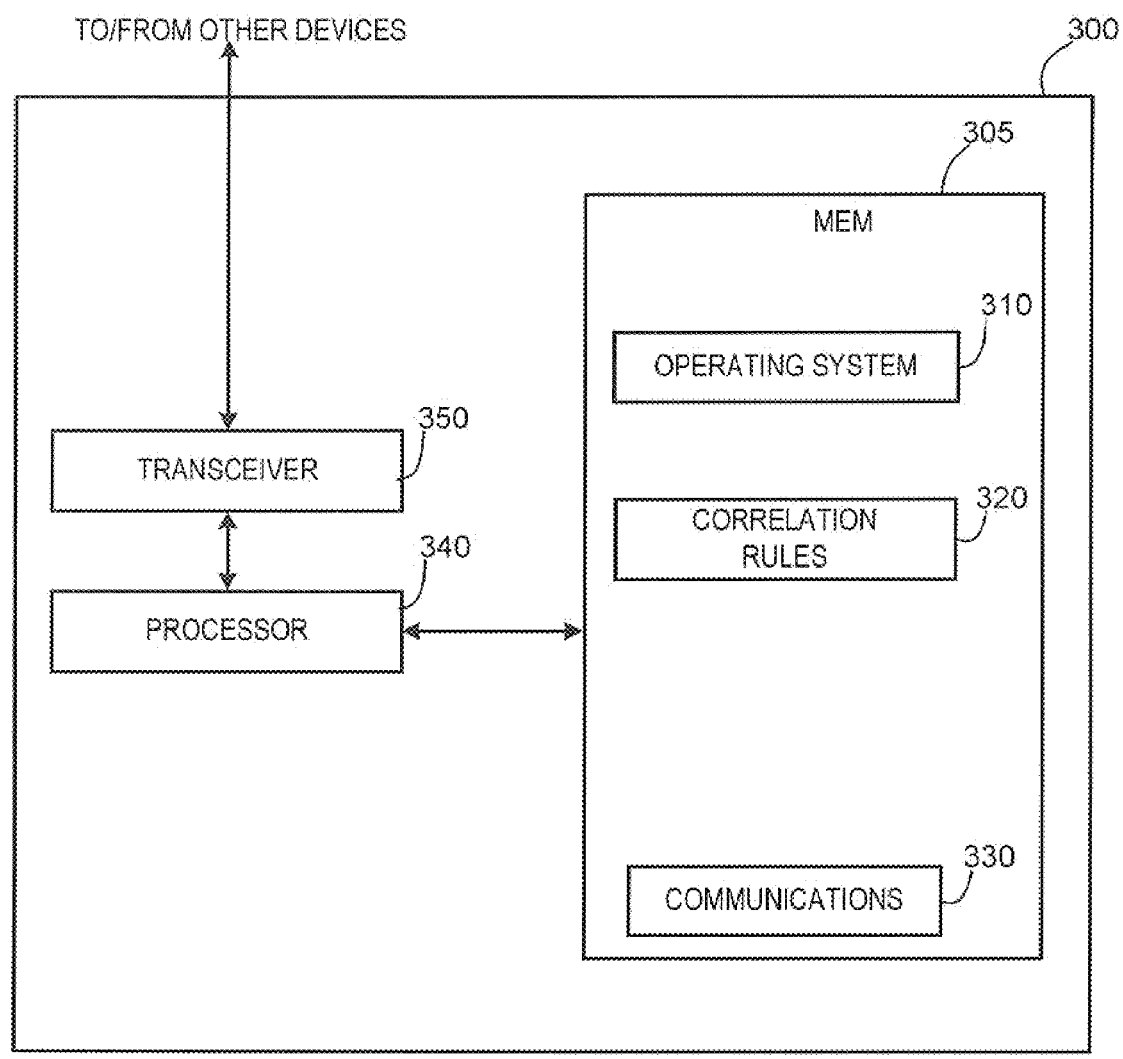
FIG. 3 illustrates an exemplary device for correlating data representing the occurrence of special service impacting events according to an exemplary embodiment.

FIG. 3 illustrates an exemplary system for correlating data representing the occurrence of special-service-impacting events according to exemplary embodiments. Referring now to FIG. 3, the system 300 includes a processor 340, a transceiver 350, and a memory 305. The processor 340 communicates with the memory 305 via an address/data bus. The processor 340 may be, for example, a commercially available or custom microprocessor. The memory 305 is representative of the one or more memory devices containing the software and data used to facilitate application of the rules for access by an observer device to a communication session in accordance with some embodiments. The memory 305 may include, but is not limited to, the following types of devices: cache, ROM, PROM, EPROM, EEPROM, flash, SRAM, and DRAM. The transceiver 350 includes a transmitter circuit and a receiver circuit, which are used to establish and maintain communication with other devices, such as the collector 110, the display 130 and the rules serer 140 shown in FIG. 1.

As shown in FIG. 3, the memory 305 may contain multiple categories of software and/or data: an operating system 310, a correlation rules module 320, and a communication module 330. The operating system 310 generally controls the operation of the correlation rules module 320. In particular, the operating system 310 may manage the correlation rules module's software and/or hardware resources and may coordinate execution of programs by the processor 340. The communication module 330 may be configured to manage the communication protocols, including both wireless and wireline protocols, that may be used by the transceiver 350 to communicate with other devices in the communication network, such as the collector 110, the display 130, and the rules server 140 shown in FIG. 1. The communication protocols may include, but are not limited to TCP/IP, H.323, etc. The communication module 330 may control conversion of signals received in one type of communication protocols into an appropriate format/protocol for transmission to other devices.

As the collector 110 also correlates data, the structure illustrated in FIG. 3 may be used for the collector 110. Further, as noted above, the collector 110 may be included in the same device as the correlator 120. In this case, rules may be included in the correlator 120 for generating correlated alerts.

Although FIG. 3 illustrates an exemplary device for correlating data representing the occurrence of special service impacting events, in accordance with some embodiments, it will be understood that the present invention is not limited to such a configuration but is intended to encompass any configuration capable of carrying out operations described herein.

Computer program code for carrying out operations of devices, terminals, and/or systems discussed above with respect to FIGS. 1-3 may be written in a high level programming language, such as Java, C, and/or C++, for development convenience. In addition, computer program code for carrying out operations of embodiments may also be written in other programming languages, such as, but not limited to, interpreted languages. Some modules or routines may be written in assembly language or even micro code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to message flow, flowchart and/or block diagram illustrations of methods, devices, and/or computer program products. These message flow, flowchart and/or block diagrams further illustrate exemplary operations for performing correlation of special-service-impacting events in accordance with various embodiments. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method, for processing data in an internet protocol network, comprising:
   collecting, in the internet protocol network, by a system having at least one processor, real-time data representing occurrence of events impacting special services in trunk groups that are in service;
   collecting, by the system, call detail records recorded by network elements representing occurrence of call events impacting special services;
   collecting, by the system, performance measurements of network elements representing occurrence of events affecting performance of the network elements impacting the special services;
   collecting, by the system, data representing faults in a network element server;
   correlating, by the system, for special services associated with dedicated trunk groups, the collected real-time data representing occurrence of trunk group events, collected call detail record and collected performance measurements, wherein alarms are generated based on the correlated data; and
   correlating, by the system, the collected data representing faults in the network element server with the generated alarms.

2. The method of claim 1, further comprising:
   collecting, by the system, data representing occurrence of trunk group out of service events impacting special services in out-of service trunk groups;
   correlating, by the system, the collected data representing occurrence of trunk group out of service events with the collected real-time data representing occurrence of trunk group events, the collected call detail records and the collected performance measurements, wherein the alarms are generated based on the correlated data.

3. The method of claim 1, wherein the trunk group events include occurrences of simple network management protocol trap events, the call events include at least one of call set-up, call prorates, and call-tear down, and the performance measurements includes data from managing information bases.

4. The method of claim 1, further comprising reducing the alarms generated by suppressing duplicate collected data, wherein the duplicate collected data includes data collected from multiple sources for the same event that is redundant in determining a root cause of an event.

5. The method of claim 1, wherein the network supports at least one of video teleconferencing services, voice communication, and data communication.

6. The method of claim 1, further comprising presenting the correlated data for display and for trouble ticket generation, such that special service impacting events for trunk groups, call detail records, performance measurements, out of service trunk groups, and faults in a network element server are reported in one display area and on one trouble ticket.

7. A system comprising:
a server that receives, in an internet protocol network, collected real-time data representing occurrence of trunk group events impacting special services in trunk groups that are in service, collected call detail records recorded by network elements representing occurrence of call events impacting special services, and collected performance measurements of network elements representing occurrence of events affecting performance of the network elements impacting the special services, and collected data representing faults in a network element server; and
a correlator that correlates special services associated with dedicated trunk groups to the collected real-time data representing occurrence of trunk group events, collected call detail record and collected performance measurements, wherein alarms are generated based on the correlated data, wherein the correlator further correlates the collected data representing faults in the network element server with the generated alarms.

8. The system of claim 7, wherein the collector further receives collected data representing occurrence of trunk group out of service events impacting special services in out-of service trunk groups, and the correlator correlates the collected data representing occurrence of trunk group out of service events with the collected real-time data representing occurrence of trunk group events, the collected call detail records and the collected performance measurements, and wherein alarms are generated based on the correlated data.

9. The system of claim 7, wherein the trunk group events include occurrences of simple network management protocol trap events, the call events include at least one of call set-up, call prorates, and call-tear down, and the performance measurements include data from managing information bases.

10. The system of claim 7, wherein the alarms generated by suppressing duplicate collected data are reduced by removing data collected from multiple sources for the same event that is redundant in determining a root cause of an event.

11. The system of claim 7, wherein the network supports at least one of video teleconferencing services, voice communication, and data communication.

12. The system of claim 7, wherein the correlator further outputs the correlated data for display and trouble ticket generation, such that events impacting special services in trunk groups, call detail records, performance measurements, out of service trunk groups and faults in a network element server are reported in one display area and on one trouble ticket.

13. A non-transitory computer-readable medium having stored thereon, computer-executable instructions that, when executed by a processor, cause the processor to perform operations comprising:
collecting real-time data representing occurrence of trunk group events impacting special services in trunk groups that are in service;
collecting call detail records recorded by network elements representing occurrence of call events impacting special services;
collecting performance measurements of network elements representing occurrence of events affecting performance of the network elements impacting the special services;
collecting data representing faults in a network element server;
correlating, for special services associated with dedicated trunk groups, the collected real-time data representing occurrence of trunk group events, collected call detail record and collected performance measurements, wherein alarms are generated based on the correlated data; and
correlating the collected data representing faults in the network element server with the generated alarms.

14. The non-transitory computer-readable medium of claim 13, wherein the instructions, when executed by the processor, further cause the processor to perform operations comprising:
collecting data representing occurrence of trunk group out of service events impacting special services in out-of service trunk groups; and
correlating the collected data representing occurrence of trunk group out of service events with the collected real-time data representing occurrence of trunk group events, the collected call detail records and the collected performance measurements, wherein alarms are generated based on the correlated data.

15. The non-transitory computer-readable medium of claim 13, wherein the instructions, when executed by the processor, further cause the processor to perform operations comprising: reducing the alarms generated by suppressing duplicate collected data, wherein the duplicate collected data includes data collected from multiple sources for the same event that is redundant in determining a root cause of an event.

16. The non-transitory computer-readable medium of claim 13, wherein the network supports at least one of video teleconferencing services, voice communication, and data communication.

17. The non-transitory computer-readable medium of claim 13, wherein the instructions, when executed by the processor, further cause the processor to perform operations comprising:
presenting the correlated data for display, such that special service impacting events for trunk groups, call detail records, performance measurements, out of service trunk groups, and faults in a network element server are reported in one display area; and
presenting data for trouble ticket based on the correlated data, such that special service impacting events for trunk groups, call detail records, performance measurements, out of service trunk groups, and faults in the network element server are reported in one trouble ticket.

* * * * *